Aug. 18, 1964     M. G. DE FRIES ETAL     3,144,830
SOLID PROPELLENT GRAINS
Filed April 10, 1961
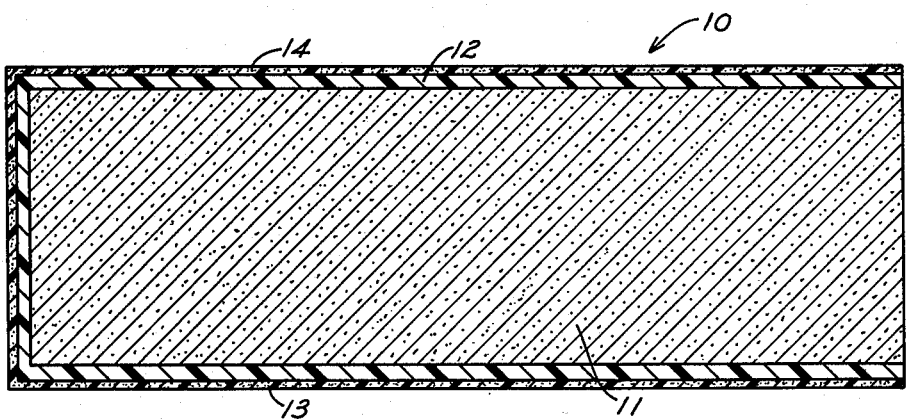
INVENTORS.
MYRON G. DEFRIES
ALVIST V. RICE
BY
Martha L. Ross
AGENT

United States Patent Office 3,144,830
Patented Aug. 18, 1964

3,144,830
SOLID PROPELLENT GRAINS
Myron G. De Fries, Bethesda, Md., and Alvist V. Rice, Springfield, Va., assignors to Atlantic Research Corporation, Fairfax County, Va., a corporation of Virginia
Filed Apr. 10, 1961, Ser. No. 101,643
13 Claims. (Cl. 102—98)

This invention relates to new and improved surface-inhibited propellent grains.

The use of solid propellent grains to produce propulsive gases, as, for example, to produce thrust in a reaction motor, is well known. Such grains are made of compositions which are self-contained with respect of their oxygen requirements for combustion, are cast or molded into a suitable size and shape, and are inserted into the combustion chamber of the reaction motor. The grains are generally elongated cylindrical bodies. They can be designed as end-burning grains, which burn from one end; as internally-burning grains having a longitudinal perforation, which provides an internal burning surface; or as externally burning grains, which burn from the outside lateral surface toward the center of the grain along burning surfaces provided by longitudinal, uninhibited recesses in the side wall of the grain. One of the important parameters in determining the mass rate of gas generation of such grains is the area of burning surface. Control of burning surface area can be obtained by the well-known expedient of restricting burning of the grain to a predetermined surface or surfaces. This can be accomplished by preventing the ignition of other of the grain surfaces by means of an inhibitor coating. Such coatings do not ignite because they generally are polymeric materials, such as cellulose acetate or ethyl cellulose, formulated without oxygen available for combustion.

The positioning of the inhibitor coating is determined by grain design and the desired mode of burning. In the case of cylindrical end-burning or internally-burning grains, the inhibitor coats the entire lateral, exterior, cylindrical surface of the grain. In some instances, as in the case of a cruciform-shaped grain, only the most peripheral lateral surfaces of the grain are inhibited.

The inhibitor coating must adhere tenaciously and continuously to the grain since any break in the bond might result in ignition at that point and a disastrous increase in the rate of gas generation and pressure in the motor. The coating must also be adequate to provide the thermal insulation requisite to prevent ignition of the inhibited grain surfaces, preferably with a minimum of added inert weight and volume. Dead weight and rocket motor size tolerances can become very critical in many rocket applications.

The object of this invention is to provide inhibitor coatings for solid propellent grains having greatly improved insulating, protective, and physical properties with a minimum of added inhibitor thickness or weight.

Another object is to provide an improved inhibitor coating which can be tailored to the specific requirements of a particular rocket application without requiring substantial redesign of the rocket motor or propellent grain.

Other objects and advantages will become obvious from the following detailed description and the single accompanying drawing showing a semi-diagrammatic longitudinal section of an inhibited end-burning grain according to our invention.

Broadly speaking, our invention comprises applying to a base inhibitor coating, which can be any conventional inhibitor, a post-coating or secondary inhibitor layer, comprising a solid, insoluble inert filler of low thermal conductivity dispersed in a solid organic polymer binder. We have discovered that a very thin layer of such a dispersion, when superimposed on the base inhibitor, increases heat insulation properties to a considerably larger degree than the relative increase in overall inhibitor thickness. Although the concentration of inert filler is not critical, the degree of increase in thermal insulation is, to a substantial extent, determined by the amount incorporated into the post-coating.

In practice, the inert solid filler is admixed with a liquid organic binder which, after application as the inhibitor post-coat, sets into a tenaciously adherent solid film. The liquid vehicle can be in the form of liquid monomers or liquid prepolymers, which are subsequently cured in place, or in the form of a fully cured solid organic polymer suspended or dissolved in a liquid organic vehicle. The addition of finely divided, insoluble, solids into such organic binder vehicles poses difficulties in practical application as an inhibitor coating because of the very substantial increase in viscosity, which it causes. This is so regardless of the particular organic binder employed, although, of course, the more fluid the binder vehicle at the time of mixing, the more easily can the mixtures be processed. It is very difficult, successfully to form highly viscous compositions into thin films of uniform, controllable thickness. This is a problem particularly in the case of propellent grain inhibitors, where tolerances are small and critical, and high inhibitor application or curing temperatures must be avoided.

We have found that organic inhibitor compositions containing appreciable amounts of finely divided, inert solids, are most advantageously prepared with the aid of volatile solvents, which reduce the viscosity of the mixture and, thereby, make possible practical and easily controllable application of the foiled inhibitor coatings in the desired thin, uniform layers. Since the post-coatings are thin, subsequent removal of the volatile solvent can be quickly and easily accomplished. The expedient of employing a viscosity-reducing volatile solvent should generally not be used in a primary or base inhibitor coating, particularly if it is applied directly to the solid propellent grain, as by brushing, spraying, dipping or casting and set or cured in place, since the solvent has an adverse effect on the grain. This is generally evidenced by a weakened bond between the grain and inhibitor coating and, in some cases, by such undesirable changes in the portion of the grain adjacent to the inhibited surface as leaching of plasticizer or oxidizer and weakening of the polymeric binder. In the case of preformed primary inhibitors which are bonded by means of an adhesive composition to the grain, even a minor residue of a volatile solvent also undesirably weakens the adhesive bond.

The inert solid filler-containing post-coating possesses several important advantages in addition to its improvement of the thermal insulation value of the inhibitor liner. It has been found that, almost invariably, any relatively thin layer of an organic polymer develops pinholes upon curing. For most purposes, this is not a matter of concern. In the case of an inhibitor coating on a propellent grain, this is undesirable since the pinholes, even those minute in size, provide a mode of access for high pressure, high temperature combustion gases to approach the surface of the grain. The post-coating, by sealing the pin-holes in the inhibitor base coating, largely eliminates this problem.

The post-coating also helps to reduce rocket redesign problems by making it possible to tailor the inhibitor liner to the thermal insulation requirements of a particular application merely by the application onto the standard base coating of a thin, easily applied, uniform post-coating formulated to give the desired overall insulating properties.

The insoluble solid filler component of the post-coating can be any inert solid in such a form as to have a lower thermal conductivity than that of the organic polymer binder in which it is dispersed. The lower thermal conductivity can be a property of the material per se, or imparted by the physical state of the filler, or a combination of both factors. Finely-divided powders and porous or hollow particles, for example, have lower thermal conductivities than the same material in block or continuous matrix form. Although this is not essential, the solid filler also preferably exerts an opacifying effect, since this assists in minimizing radiant heat transfer. In practice, most suitable thermally-insulating solid fillers also opacify to varying degrees. The term "inert" as employed to define the solid filler refers to a material which does not react chemically with the organic binder (or other components) of the post-coating.

Examples of the suitable inert, insoluble solids of low thermal conductivity include such materials as the metal silicates, e.g. Al, Mg, Ca, and Cr silicates in various forms, such as asbestos, ground furnace slag, bentonite clays, talc, hollow glass spheres, etc.; metal oxides, e.g., the oxides of Al, Cr, Ti, Zr, Mg and Ca; silica; the refractory carbides e.g. Ba, Si, Zr, B, and Al carbides; nitrides, e.g. B and Al nitrides; inorganic salts, e.g. Ba, Ca, and Mg carbonates, sulfates, and the like. In general we prefer inorganic solids, as aforedescribed. Solid, synthetic, insoluble, organic polymers can also be employed if they have a lower thermal conductivity than the polymeric organic binder, either per se or by virtue of their physical form, e.g. hollow spheres or microballoons made of a phenolic resin, which may be filled with air or an inert gas, such as $N_2$ or $CO_2$.

We have found finely-divided asbestos powder and asbestos fibers, preferably the former, particularly effective for our purpose. Although on a weight-percentage basis, the fibers offer better overall performance, particularly in terms of erosion resistance, in even relatively small concentrations, they pose a practical problem of application since they tend to cause the coatings to mat or ball and, therefore, to be uneven. In low concentrations, e.g. up to about 10 phr. (parts per hundred parts of resin), preferably with the aid of a volatile solvent diluent, asbestos fibers can, however, be used very effectively.

The concentration of the inert, insoluble, solid filler is, of course, largely determined by such factors as the particular heat insulating filler used, the degree of overall thermal insulation required and the added weight and thickness tolerances permitted by the rocket design. Some improvement in heat insulation properties is obtained with filler concentrations in the post-coating as low as about 1% by weight. The preferred minmum is about 5% by weight.

Any suitable organic binder can be employed in formulating the inhibitor post-coat. Preferably it is one which is compatible and forms a strong adhesive bond with the primary or base inhibitor coating. Some polymers, such as epoxy polymers including copolymers, such as epoxy polyamide copolymers, are strongly adherent to a large variety of other polymers, such as polyurethanes, cellulose esters, cellulose ethers, polyesters, and the like. Excellent compatibility and adhesion can also be obtained by employing the same organic polymer in both the post- and base inhibitor coatings, as, for example, polyvinyl chloride, cellulose acetate, ethyl celluose, and the like.

Since we prefer to apply the inhibitor post-coating to the propellant grain having the base inhibitor coating already cured or set into place, by such procedures as brushing, spraying, dipping or casting, the inert, solid filler must be distributed in a liquid vehicle, which, after such dispersion, must retain sufficient fluidity and workability for the successful formation of a thin, uniform coating. This can be achieved, as aforementioned, by employing liquid monomers or prepolymers, which are cured into solid binders after application of the coating. Examples of suitable monomer systems include components which condense into alkyd resins, e.g. a polyhydric alcohol such as glycerol, ethylene glycol, a polyglycol, pentaerythritol, and hexanediol, plus a polycarboxylic acid or anhydride such as sebacic acid, adipic acid, phthalic anhydride, and maleic anhydride, which may be crosslinked with a vinyl monomer such as sytrene if desired; components which polymerize into polyurethanes, e.g. a polyhydric alcohol, such as castor oil, polyethylene glycol, polypropylene glycol, and hexanediol, plus an organic polyisocyanate such as toluene diisocyanate and hexamethylene diisocyanate; and the like. Examples of suitable liquid prepolymer systems include polyester prepolymers which can be further condensed into solid alkyd, and polyester resins; polyhydric alcohol polyesters which are condensed with a polyisocyanate into a solid polyurethane, liquid epoxy prepolymers, liquid polyamide prepolymers, and the like. Completely cured, solid polymers, such as polybutadiene; butadiene-styrene copolymers, cellulose esters, cellulose acetate and cellulose propionate; cellulose ethers, e.g. ethyl cellulose, and the like, can be used in the form of a solution in a volatile organic solvent or in a mixture of plasticizer and volatile organic solvent. In some cases, the inert solid filler can be dispersed in a fluid plastisol slurry of the polymer in a high-boiling liquid plasticizer, which dissolves the dispersed polymer readily only at elevated temperatures. Examples of such plastisol systems include polyvinyl chloride, cellulose acetate, and ethyl cellulose, in the form of small, dense, spherical particles dispersed in liquid plasticizer, such as the diethyl, dibutyl, and dioctyl esters of phthalic, sebacic and adipic acids.

Chemically inert, volatile liquid diluents can be included in any of the aforedescribed compositions to increase fluidity and workability into a thin, uniform, inhibitor post-coat. The diluents should preferably have a boiling point at normal atmospheric pressure of less than about 150° C. so that they can be volatilized either during storage at ordinary temperatures or at elevated temperatures which are considerably below the auto-ignition temperature of the propellent grain. The particular volatile diluent used is, of course, chosen for its compatibility and solvent properties with the particular organic polymer or organic polymer and plasticizer post-coat vehicle. Examples of volatile organic diluents which can be used with various of the organic binders aforedescribed, include ethanol, propanol, isobutanol, acetone, methyl ethyl ketone, methyl isobutyl ketone, diethyl ether, methyl acetate, ethyl acetate, ethyl formate, methylene chloride, ethylene dichloride, chloroform, benzene, xylene, toluene, etc.

After application of the fluid post-coat to the grain in any suitable fashion, as by spraying, dipping, brushing or casting, the post-coat is cured or set in conventional fashion depending on the character of the particular post-coat binder. Liquid monomer and prepolymer compositions are set by polymerization curing with such aids as catalysts or heat. In some cases, the required setting is obtained merely by volatilization of the solvent and/or solution of the plastisol grade polymer in the liquid plasticizer at elevated temperatures.

As aforementioned, the inhibitor base coating can be any suitable, conventional organic polymer coating known to and used in the propellent art, and can comprise, for example, any of the aforedescribed polymeric binders employed for the inhibitor post coating. Choice of the post-coat binder is to some extent, determined by the character of the base inhibitor. Similarly our combination of inhibitor post-coat and inhibitor base coating can be used on any solid propellent grain conventionally employed in the art, including the double-base type, e.g. nitrocellulose plasticized with nitroglycerine, or the composite type comprising an intimate mixture of an oxidizer and fuel, e.g. a dispersion of an inorganic oxidizing salt such as ammonium perchlorate in a polymeric organic fuel binder such as polyvinyl chloride, polyurethane, an alkyd resin, organic polysulfide and the like.

We have found liquid epoxy prepolymer vehicles for the post-coat particularly suitable for our purpose since, after dispersion of the inert solid filler and application, they can be cured at ordinary temperatures into strong films and adhere tenaciously to a base inhibitor coating made from most of the conventionally employed organic polymer compositions such as polyvinyl chloride, ethyl cellulose, cellulose acetate, polyurethane, polyester, butadiene-acrylonitrile, and the like, as well as to an epoxy base inhibitor.

The liquid epoxy resin is preferably an aromatic epoxy, such as the reaction product of bisphenol A,

$$HOC_6H_4C(CH_3)_2C_6H_4OH$$

bisphenol F, $HOC_6H_4CH_2C_6H_4OH$; tetrachloro-bisphenol A; diphenolic acid, $(HOC_6H_4)_2(CH_3)CCH_2CH_2COOH$; cashew phenol,

$$HOC_6H_4(CH_2)_7(HOC_6H_4)CH(CH_2)_6CH_3$$

and the like, with epichlorohydrin.

Any suitable curing agent can be used to set the liquid epoxy into a solid coating, and can be selected with an eye to the particular properties desired in the cured coating, such as toughness, flexibility, softening temperature, and the like. Another factor in the choice of a curing agent lies in the curing temperature required. In many instances, it is preferable to employ an agent which produces a cure at ambient temperatures to avoid an additional heating procedure for economic reasons or to minimize the hazardous heat treatment of a sensitive propellent.

Curing and modifying agents for liquid epoxy polymers are well known in the art and include, for example, primary, secondary, and tertiary amines, such as ethylene diamine, diethylene triamine, triethylene tetramine, methylene dianiline, m-phenylene diamine, 4,4'-diamino-diphenyl sulfone, and tri-(dimethylaminomethyl)-phenol (DMP-30); liquid polyamides containing reactive amino and carboxyl groups; acid anhydrides, such a phthalic anhydride, hexahydrophthalic anhydride, and dodecylsuccinic anhydride; boron trifluoride-amine complexes; liquid organic polysulfides; and the like.

Particularly suitable for our purposes, are the liquid polyamides containing reactive, polar, amine groups. Such reactive, liquid polymers function both as curing agents, because of the reactive amine groups, and as cross-linking, coreactive, modifying agents for the liquid epoxy polymer. The cured epoxy polyamide compositions possess exceptionally low embrittlement temperatures and retain good tensile and mechanical strength at temperatures as low as $-65°$ F. and less and as high as $175°$ F. and above. Corollary advantages include relatively long pot life and curability at room temperatures. Illustrative of suitable polyamide curing and modifying compositions are the liquid resins made by reacting dimer and trimer vegetable oil acids, such as dimerized linoleic acid, with di- or triamines, such as ethylene diamine or diethylene triamine.

The amount of curing agent will, of course, vary with the particular liquid epoxy polymer and curing agent, from as little as 2 or 3 phr. for highly active catalysts, such as DMP-30, to 100 phr. of a reactive polyamide. The preferred ratios of the liquid epoxy polymer to liquid, reactive-amine-containing polyamide are 50:50 to 70:30. The mixtures of liquid epoxy and polyamide prepolymers cure fairly quickly at ambient temperatures, although setting can be accelerated, if desired by mild heating.

Although the epoxy post-coating containing the inert, heat insulating, solid filler can, as aforementioned, be applied to a large variety of base inhibitor coatings, particularly excellent results are obtained when it is applied to epoxy or epoxy-polyamide base inhibitor coatings, such as those disclosed in Myron G. De Fries et al., application S.N. 12,870, filed March 4, 1960, which disclosure is hereby incorporated by reference. Such base coatings perform successfully at substantially all environmental temperatures to which the grain may be subjected, from frigid to elevated temperatures. They can also be formed into strong, structural supports for the propellent grain by introducing, as an integral part of the base coating, one or more layers of a porous sheet, preferably in the form of a woven fabric, made of organic polymeric material, such as polyamide, e.g. nylon; polyacrylonitrile, e.g. Orlon; polyacrylate or methacrylate ester; polyester, such as Dacron; polyethylene; cellulose ester, e.g. cellulose acetate; cellulose ether; e.g. ethyl cellulose; polyvinyl, e.g. polyvinyl chloride and polystyrene; cotton; and rayon.

Referring now to the single drawing, a solid propellent grain, generally indicated by the reference numeral 10, comprises a solid propellent 11, an inner inhibitor coating 12, bonded to the propellent and an outer inhibitor coating 13, comprising a synthetic polymer, bonded to the surface of the inner coating. The outer coating contains a particulate, inert, solid filler 14 such as asbestos.

EXAMPLE 1

Sample blocks 2" x 2" x 0.225" were prepared as follows to test the heat insulating efficacy of various inert, insoluble solid fillers.

The test blocks consisted of 25 layers on nylon fabric impregnated with a liquid prepolymer formulation comprising 60 parts of Gen Epoxy 190 (the reaction product of bisphenol A and epichlorohydrin) and 40 parts of Versamide 140 (a liquid polyamide containing reactive amine groups) and allowed to cure overnight at room temperature. Except for control Sample A, the impregnating liquid prepolymer formulation was loaded with various inert insoluble solids, as shown in the following table. The flame of an oxyacetylene blow torch was applied to one side of each of the cured samples and the rate of burn-through or erosion rate determined.

*Table 1*

| Sample | Inert Solid | Phr. | Erosion rate, mils/sec. |
|---|---|---|---|
| A | | | 26.5 |
| B | Asbestos fiber | 10 | 7.0 |
| C | Mgo | 10 | 22.5 |
| D | Microballoons [1] | 10 | 19.5 |
| E | SiO$_2$ | 10 | 22.3 |
| F | Asbestos powder | 25 | 18.5 |
| G | Asbestos powder | 25 | |
|   | TiO$_2$ | 10 | 17.7 |
| H [2] | Asbestos powder | 100 | |
|   | TiO$_2$ | 10 | 9.4 |

[1] Hollow spheres of phenolic resin filled with CO$_2$.
[2] Diluted with 9 parts isobutyl alcohol, 85 parts toluene, and 15 parts methyl isobutyl ketone.

EXAMPLE 2

The following samples were prepared and subjected to an oxyacetylene torch to determine erosion rate and to a hot plate at 700° F. to determine time to ignition of a disc of solid propellent on the face of the sample opposite that seated on the hot plate. The samples were 2 inch squares. Sample A consisted of 3 layers of woven nylon fabric impregnated with 60 parts of Gen Epoxy 190 and 40 parts of Versamide 140 cured overnight at room temperature. The cured sample was 0.030 inch thick. Sample B was a sheet of polyurethane 0.07 inch thick. Sample C was similar to Sample A except that, after curing of the base, a coating of the same liquid prepolymer mixture of Gen Epoxy and Versamide containing, in addition, 100 phr. asbestos powder, 10 phr. TiO$_2$, and 50 parts xylene, was applied and allowed to cure at room temperature overnight. The applied layer was 0.010 inch thick making an overall sample thickness of 0.040 inch.

Table 2

| Sample | Torch Erosion Rate, sec./mil | Hot Plate to ignition, sec./mil |
|---|---|---|
| A | 0.099 | 3.24 |
| B | 0.077 | 1.66 |
| C | 0.202 | 6.14 |

It will be noted that the addition, in Sample C, of a 10 mil layer containing the dispersed asbestos powder and $TiO_2$, to the 30 mil base of Sample A doubles the thermal insulation efficacy of the inhibitor.

EXAMPLE 3

(A) 93 end-burning, solid propellent grains, comprising ammonium perchlorate dispersed in a plasticized polyvinyl chloride fuel binder, were each inhibited with a coating 0.03 inch thick and comprising 3 layers of woven nylon fabric impregnated with 60 parts of Gen Epoxy 190 and 40 parts of Versamide 140. The grains were inserted in rocket motors and static fired. Fifteen grain failures (16.2%) occurred at start-up, namely shortly after ignition, apparently because of erosion of the inhibitor coating caused by hot gas flow down the sides of the grain.

(B) 35 inhibited grains, identical to those described in (A), were additionally coated (after cure of the base inhibitor coating) with a liquid prepolymer mixture similar to that employed for the base coat, but containing, in addition, 100 phr. asbestos powder, 10 phr. $TiO_2$, and 50 parts xylene. The coating was applied in a thickness of 0.008 inch and cured at room temperatures. The grains were static fired in rocket motors with no failures.

(C) 6 inhibited propellant grains were prepared as described in (B) above except that a layer of woven nylon fabric was made an integral part of the 0.008 inch post coating by wrapping the grain with a sheet of the nylon after brushing on the liquid post-coat so that the porous fabric became impregnated with the coating polymer prior to curing. No failures occurred during static motor firings of the grains.

Although this invention has been described with reference to illustrative embodiments thereof, it will be apparent to those skilled in the art that the principles of this invention can be embodied in other forms but within the scope of the claims.

We claim:

1. A shaped solid propellent grain comprising a self-oxidant, gas-producing composition having at least one surface inhibited against ignition by a first solid inhibitor coating bonded thereto, said first coating consisting essentially of a cured mixture of a reactive liquid epoxy polymer and a liquid polyamide containing reactive amino groups, containing embedded therein as an integral portion thereof at least one layer of a porous sheet consisting essentially of an organic polymeric material and being of sufficient thickness to provide substantial heat insulation, said organic polymeric material being selected from the group consisting of polyamide, polyacrylonitrile, polyacrylate ester, polymethacrylate ester, polyester, polyethylene, cellulose ester, cellulose ether, polyvinyl, cotton, and rayon, and a second solid inhibitor coating, bonded to the exterior surface of said first inhibitor coating, and consisting essentially of an organic polymer binder containing dispersed therein at least about 1% by weight of a particulate, inert, solid filler having a lower thermal conductivity than that of the polymer binder, said first coating being free from such filler.

2. The propellent grain of claim 1 in which the reactive epoxy polymer in the first inhibitor coating comprises the reaction product of bisphenol A and epichlorohydrin.

3. The propellent grain of claim 1 in which the particulate inert solid filler is asbestos.

4. The propellent grain of claim 1 in which the porous sheet is in the form of a woven fabric.

5. The propellent grain of claim 4 in which the porous sheet consists essentially of a polyamide.

6. The propellent grain of claim 5 in which the particulate, inert, solid filler is asbestos.

7. The propellent grain of claim 1 in which the organic polymer binder of said second inhibitor coating comprises an epoxy polymer.

8. The propellent grain of claim 7 in which the organic polymer binder of said second inhibitor coating comprises a cured mixture of a reactive epoxy polymer and a reactive polyamide containing reactive amino groups.

9. The propellent grain of claim 8 in which the reactive epoxy polymer of said second inhibitor coating is the reaction product of bisphenol A and epichlorohydrin.

10. The propellent grain of claim 8 in which the particulate inert solid filler is asbestos.

11. The propellent grain of claim 8 in which the porous sheet is in the form of a woven fabric.

12. The propellent grain of claim 11 in which the porous sheet consists essentially of a polyamide.

13. The propellent grain of claim 12 in which the particulate, inert, solid filler is asbestos.

References Cited in the file of this patent

UNITED STATES PATENTS

| 2,958,288 | Campbell et al. | Nov. 1, 1960 |
| 2,977,884 | Mahon et al. | Apr. 4, 1961 |
| 3,012,507 | Mosher et al. | Dec. 12, 1961 |